(12) United States Patent
Chang et al.

(10) Patent No.: US 10,037,400 B2
(45) Date of Patent: Jul. 31, 2018

(54) INTEGRATED CIRCUIT MANUFACTURING PROCESS FOR ALIGNING THRESHOLD VOLTAGES OF TRANSISTORS

(71) Applicant: Marvell World Trade Ltd., St. Michael (BB)

(72) Inventors: Runzi Chang, San Jose, CA (US); Winston Lee, Palo Alto, CA (US); Peter Lee, Pleasanton, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 15/611,628

(22) Filed: Jun. 1, 2017

(65) Prior Publication Data

US 2017/0351802 A1 Dec. 7, 2017

Related U.S. Application Data

(60) Provisional application No. 62/344,596, filed on Jun. 2, 2016.

(51) Int. Cl.
*G11C 11/40* (2006.01)
*G06F 17/50* (2006.01)
*G11C 11/412* (2006.01)

(52) U.S. Cl.
CPC ........ *G06F 17/5077* (2013.01); *G11C 11/412* (2013.01); *G06F 2217/12* (2013.01)

(58) Field of Classification Search
CPC ............................ G11C 11/412; G06F 17/5077
USPC ............................................. 365/63, 72, 154
See application file for complete search history.

(56) References Cited

U.S. PATENT DOCUMENTS

| 6,061,267 A * | 5/2000 | Houston ............... G11C 11/404 365/154 |
| 6,519,176 B1 * | 2/2003 | Hamzaoglu ........... G11C 11/412 365/154 |
| 7,404,154 B1 * | 7/2008 | Venkatraman ...... H01L 27/0207 326/103 |
| 8,077,510 B2 * | 12/2011 | Ouchi ................... G11C 11/412 365/154 |
| 2003/0076705 A1 * | 4/2003 | Yamaoka ............... G11C 5/146 365/154 |

(Continued)

OTHER PUBLICATIONS

Amelifard et al., "Low-leakage SRAM Design with Dual Vt Transistors", ISQED '06 Proceedings of the 7th International Symposium on Quality Electronic Design, IEEE Computer Society, Mar. 27, 2006, pp. 729-734.

(Continued)

*Primary Examiner* — Tan T. Nguyen

(57) ABSTRACT

In some implementations, a method of fabricating an integrated circuit includes obtaining first data for a first chip containing a first version of the integrated circuit, determining that a transistor should be coupled with another transistor, selecting one or more masks for coupling the transistor with the other transistor to adjust the threshold voltage of the transistor, obtaining second data for a second chip containing a second version of the integrated circuit, determining that the second version of the integrated circuit meets one or more requirements, and preparing a final integrated circuit design for production based on the second version of the integrated circuit.

20 Claims, 5 Drawing Sheets

(56) References Cited

U.S. PATENT DOCUMENTS

| | | | |
|---|---|---|---|
| 2005/0018474 A1* | 1/2005 | Sohn | G11C 11/419 |
| | | | 365/154 |
| 2007/0025142 A1* | 2/2007 | Joo | G11C 11/412 |
| | | | 365/154 |
| 2007/0206404 A1* | 9/2007 | Yamagami | G11C 5/14 |
| | | | 365/154 |
| 2008/0151604 A1* | 6/2008 | Suzuki | G11C 11/412 |
| | | | 365/154 |
| 2010/0172194 A1 | 7/2010 | Chang et al. | |
| 2013/0107609 A1* | 5/2013 | Chang | G11C 11/412 |
| | | | 365/154 |
| 2015/0380425 A1* | 12/2015 | Ogata | H01L 27/11573 |
| | | | 257/324 |

OTHER PUBLICATIONS

Chetna, "Design of 6T-SRAM Cell Using Dual Threshold Voltage Transistor", International Journal of Engineering Research & Technology (IJERT), vol. 1, Issue 3, May 2012, 4 pages.

Das et al., "Multi Threshold Low Power SRAM Using Floating Gates", International Journal of Innovative Research in Computer and Communication Engineering, vol. 3, Issue 3, Mar. 2015, pp. 2370-2376.

Kushwaha et al., "A Comparative Study of Single-and Dual-Threshold voltage SRAM Cells", Journal of Telecommunications and information Technology, 2011, pp. 124-130.

Ankur Srivastava, "Simultaneous Vt Selection and Assignment for Leakage Optimization", ISLPED '03, Aug. 25-27, 2003, pp. 146-151.

Zhang et al., "Analysis of 7/8-nm Bulk-Si FinFET Technologies for 6T-SRAM Scaling", IEEE Transactions on Electron Devices, vol. 63, No. 4, Apr. 2016, pp. 1502-1507.

\* cited by examiner

INTEGRATED CIRCUIT MANUFACTURING PROCESS FOR ALIGNING THRESHOLD VOLTAGES OF TRANSISTORS

CROSS REFERENCE TO RELATED APPLICATIONS

This disclosure claims the benefit of priority under 35 U.S.C. § 119(e) of U.S. Provisional Application No. 62/344,596 filed on Jun. 2, 2016, titled "Method to Decouple the FinFET SRAM Transistors Driving Currents Without Changing Process Complexity," the disclosure of which is hereby incorporated by reference in its entirety.

BACKGROUND

The present disclosure relates to semiconductor device manufacturing.

An integrated circuit (IC) is a set of electronic circuits on a single chip of semiconductor material such as silicon. An IC contains core logic devices such as logic gates, flip-flops, multiplexers, and other circuits that perform basic logic functions. Examples of ICs include microprocessors, digital signal processors (DSPs), microcontrollers, application-specific integrated circuits (ASICs), and memory chips. A system on chip (SOC) is an IC that integrates components (e.g., a microprocessor and a memory) of an electronic system on a single chip.

One specific example of a memory that can be included on a chip is a static random access memory (SRAM). A SRAM includes SRAM cells, multiplexing circuitry, and demultiplexing circuitry. A SRAM cell stores a bit of data using the state of a six-transistor memory cell. Multiple SRAM cells (e.g., 8 or 16 cells) that are accessed by the same address form a memory block. A SRAM is manufactured in a logic process for fast speed, low standby power, and simple process flow. A SRAM may be produced using a multiple-gate field effect transistor (e.g., FinFET) process technology.

In an advanced FinFET process technology, the threshold voltage (Vt) of a SRAM transistor is tied to the threshold voltage of a standard Vt (SVT) transistor, and thus the driving current of the SRAM transistor is tied to the driving current of the SVT transistor. For example, in a 16 nm FinFET manufacturing process, the same threshold voltage implant is shared between a SRAM transistor and a SVT transistor. As another example, in a Hi-K Metal Gate manufacturing process, the same work function metal is shared between a SRAM transistor and a SVT transistor. Because the threshold voltage of the SRAM transistor is tied to the threshold voltage of a SVT transistor, adjusting the threshold voltage of the SRAM transistor would require changing the threshold voltage of the SVT transistor. Typically, the SVT transistor is part of a core logic device and changing the threshold voltage of the SVT transistor may affect the timing and functionality of the core logic device.

SUMMARY

The present disclosure describes techniques relating to semiconductor device manufacturing. In high-volume manufacturing process technology, it may be desirable to adjust the threshold voltage of a transistor (e.g., a SRAM transistor) independently from the threshold voltage of a STV transistor. Where an IC contains transistors having different threshold voltages within core logic devices, the threshold voltage of a transistor may be adjusted by aligning the threshold voltage (and thus the driving current) of the transistor to the threshold voltage of a transistor of one of any available core logic device on the IC.

According to an aspect of the present disclosure, a technique for manufacturing an IC includes obtaining first data for a first chip containing a first version of the integrated circuit, the integrated circuit comprising a transistor for which a threshold voltage is to be adjusted, the integrated circuit comprising a plurality of other transistors having different threshold voltage values, the first version of the integrated circuit comprising the transistor being coupled with a first one of the plurality of other transistors; determining, based on i) the obtained first data and ii) one or more requirements for the integrated circuit related to the threshold voltage of the transistor, that the transistor should be coupled with a second one of the plurality of other transistors; in response to determining that the transistor should be coupled with the second one of the plurality of other transistors, selecting one or more masks for coupling the transistor with the second one of the plurality of other transistors to adjust the threshold voltage of the transistor; obtaining second data for a second chip containing a second version of the integrated circuit, the second version of the integrated circuit comprising the transistor being coupled with the second one of the plurality of other transistors; determining, based on the obtained second data, that the second version of the integrated circuit meets the one or more requirements; and in response to determining that the second version of the integrated circuit meets the one or more requirements, preparing a final integrated circuit design for production based on the second version of the integrated circuit.

According to another aspect of the present disclosure, an IC is manufactured by a process that includes obtaining first data for a first chip containing a first version of the integrated circuit, the integrated circuit comprising a transistor for which a threshold voltage is to be adjusted, the integrated circuit comprising a plurality of other transistors having different threshold voltage values, the first version of the integrated circuit comprising the transistor being coupled with a first one of the plurality of other transistors; determining, based on i) the obtained first data and ii) one or more requirements for the integrated circuit related to the threshold voltage of the transistor, that the transistor should be coupled with a second one of the plurality of other transistors; in response to determining that the transistor should be coupled with the second one of the plurality of other transistors, selecting one or more masks for coupling the transistor with the second one of the plurality of other transistors to adjust the threshold voltage of the transistor; obtaining second data for a second chip containing a second version of the integrated circuit, the second version of the integrated circuit comprising the transistor being coupled with the second one of the plurality of other transistors; determining, based on the obtained second data, that the second version of the integrated circuit meets the one or more requirements; and in response to determining that the second version of the integrated circuit meets the one or more requirements, preparing a final integrated circuit design for production based on the second version of the integrated circuit.

According to yet another aspect of the present disclosure, an IC includes one or more SRAMs comprising a plurality of SRAM transistors; and a plurality of core logic devices comprising a plurality of core logic transistors having different threshold voltage values, wherein a first SRAM transistor of the plurality of SRAM transistors of the one or more SRAMs is coupled with a first core logic transistor of the plurality of core logic transistors having a first threshold voltage value thereby setting a threshold voltage of the first SRAM transistor at the first threshold voltage value, wherein a second SRAM transistor of the plurality of SRAM transistors of the one or more SRAMs is coupled with a second, different core logic transistor of the plurality of core logic transistors having a second, different threshold voltage value thereby setting a threshold voltage of the second SRAM transistor at the second, different threshold voltage value.

The described techniques can be implemented so as to realize one or more of the following potential advantages. The described techniques allow decoupling of the threshold voltage of a transistor (e.g., a SRAM transistor) from the threshold voltage of a SVT transistor, thereby allowing adjustment of the threshold voltage or driving current of the decoupled transistor independently from the SVT transistor. Providing the ability to independently adjust the threshold voltages of transistors may maximize the production yield at process, voltage, and temperature (PVT) corners.

Details of one or more implementations are set forth in the accompanying drawings and the description below. Other features, objects, and advantages may be apparent from the description, the drawings, and the claims.

DETAILED DESCRIPTION

Various implementations of the present disclosure are discussed below in conjunction with an example of an IC that includes core logic devices and SRAM. In the described implementations, the threshold voltage of a SRAM transistor can be aligned to the threshold voltage of a transistor of any one of the available core logic devices on the IC during the IC manufacturing process. The techniques described in this disclosure are generally applicable to any IC in which it is desirable to adjust the threshold voltage and driving current of a transistor. Accordingly, other implementations of ICs can include components different than those described in the present disclosure. For example, the techniques described in the present disclosure can be applied to an IC that includes core logic devices and dynamic random access memory (DRAM).

Figure 1:
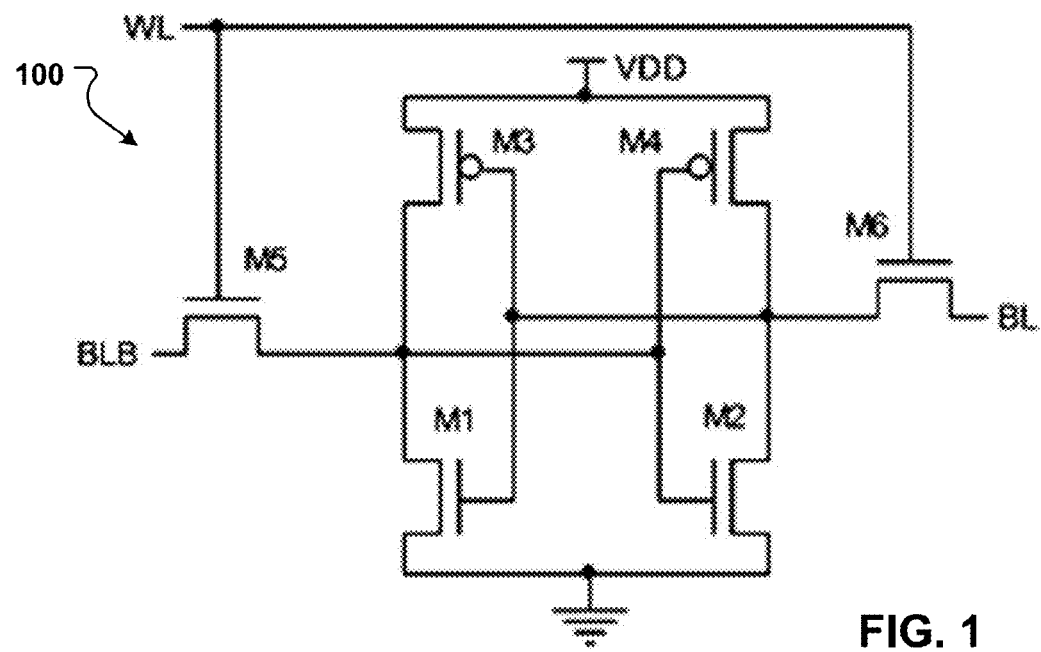
FIG. 1 is a schematic diagram showing an example of a SRAM cell.

FIG. 1 is a schematic diagram of an example of a SRAM cell 100. The SRAM cell 100 includes six transistors M1, M2, M3, M4, M5, and M6 between VDD and ground. The six transistors can be field-effect transistors (FETs). The transistors M1 and M2 are N-type metal-oxide semiconductor (NMOS) transistors for pull-down of the SRAM cell 100, while the transistors M3 and M4 are P-type metal-oxide semiconductor (PMOS) transistors for pull-up of the SRAM cell 100. The transistors M5 and M6 are NMOS transistors for access to the SRAM cell 100. While FIG. 1 shows a six-transistor SRAM cell 100, other implementations of SRAM cells may include four, eight, ten, or more transistors.

The SRAM cell 100 stores a bit on the four transistors M1, M2, M3, and M4 that form two cross-coupled inverters. The SRAM cell 100 has two stable states which are used to denote "0" and "1". The two transistors M5 and M6 control access to the SRAM cell 100 during read and write operations. The two transistors M5 and M6 are controlled by a signal applied to the word line WL. When access to the SRAM cell 100 is enabled by asserting the word line WL, the SRAM cell 100 is connected to the bit lines BLB and BL to transfer a bit for read and write operations. Although the SRAM cell 100 provides access via two bit lines BLB and BL to improve noise margins, other implementations of SRAM cells may provide access via a single bit line.

Figure 2:
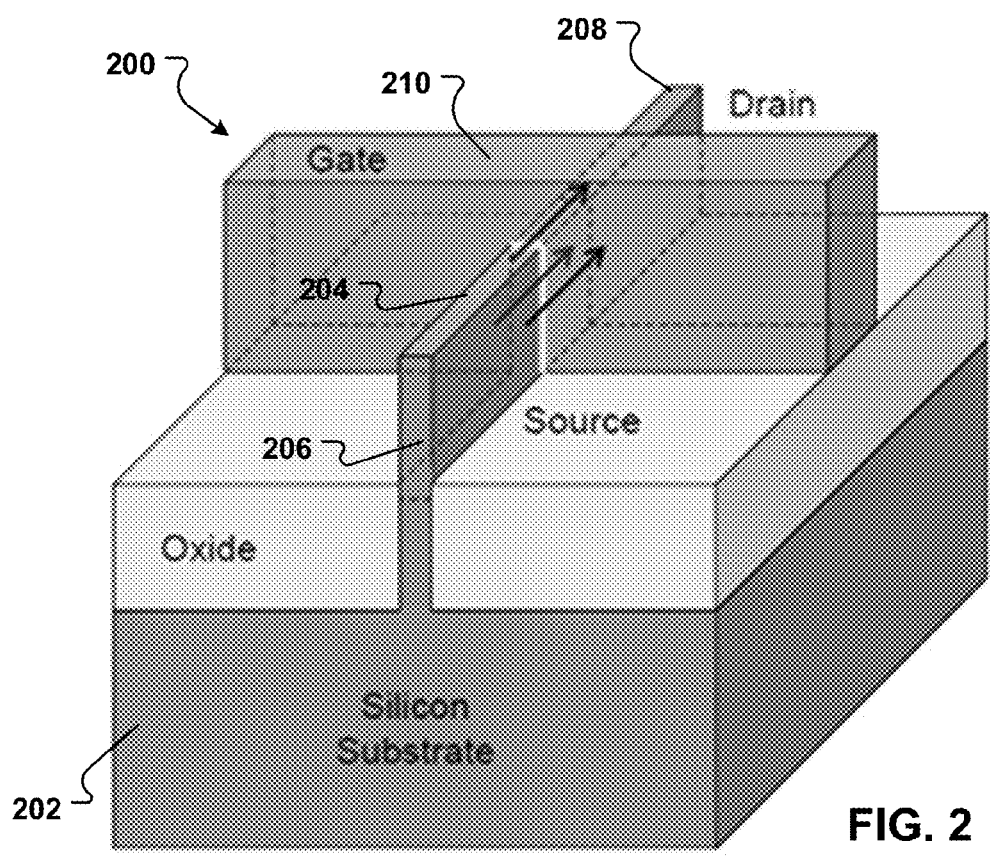
FIG. 2 shows an example of a transistor that can be included in a SRAM cell.

FIG. 2 shows an example of a transistor 200 that may be included in a SRAM cell. The transistor 200 is a fin field-effect transistor (finFET), which is a nonplanar, double-gate transistor built on a silicon substrate 202. The transistor 200 includes a channel 204 between the source end 206 and the drain end 208. The channel 204 is wrapped by a thin silicon fin, which forms the body of the transistor 200. Another example of a transistor that may be included in an SRAM cell is a gate-all-around (GAA) FET. GAA FETs are similar in concept to FinFETs except the gate material surrounds the channel region on all sides.

The channel 204 provides a path through which current can flow between the source end 206 and the drain end 208. Varying the voltage between the gate 210 and the body modulates the conductivity of the channel 204 and thereby controls the current flow between the source end 206 and the drain end 208. The minimum gate-to-source voltage differential at which current flows in the channel 204 is referred to as the threshold voltage (Vt) of the transistor 200. For a NMOS transistor, if the gate voltage is below the threshold voltage, the transistor 200 is turned off and no current flows between the source end 206 and the drain end 208; if the gate voltage is above the threshold voltage, the transistor 200 is turned on, creating a low resistance channel where current can flow between the source end 206 and the drain end 208. For a PMOS transistor, the transistor 200 is turned off when the gate voltage is above the threshold voltage and turned on when the gate voltage is below the threshold voltage.

In FinFET technology, the body of the transistor 200 influences the threshold voltage because it is not tied to the source of the transistor 200. The threshold voltage changes by an amount approximately equal to the change in the source-to-body voltage. Thus, the threshold voltage of the transistor 200 can be controlled by connecting the body of the transistor 200 to a voltage source separate from the source and drain terminals. Threshold voltages of multiple transistors can be aligned by tying their bodies together.

The performance of a transistor may be affected by variations in process, voltage, and temperature (PVT). During manufacturing, dies located at the center of a wafer are typically accurate in their process values (e.g., length between source and drain, oxide thickness, impurity concentration), whereas dies located at the periphery tend to deviate from the process values. This deviation may impact the performance of a transistor. During operation, voltage and temperature variations may affect the performance of a transistor. In high-volume manufacturing process technology, adjusting the threshold voltages of transistors independently from standard Vt (SVT) transistors may maximize the production yield especially at PVT corners. The threshold voltage of a transistor may be adjusted by aligning the threshold voltage (and thus the driving current) of the transistor to the threshold voltage of a transistor of one of any available and suitable core logic device on the IC.

Figure 3:
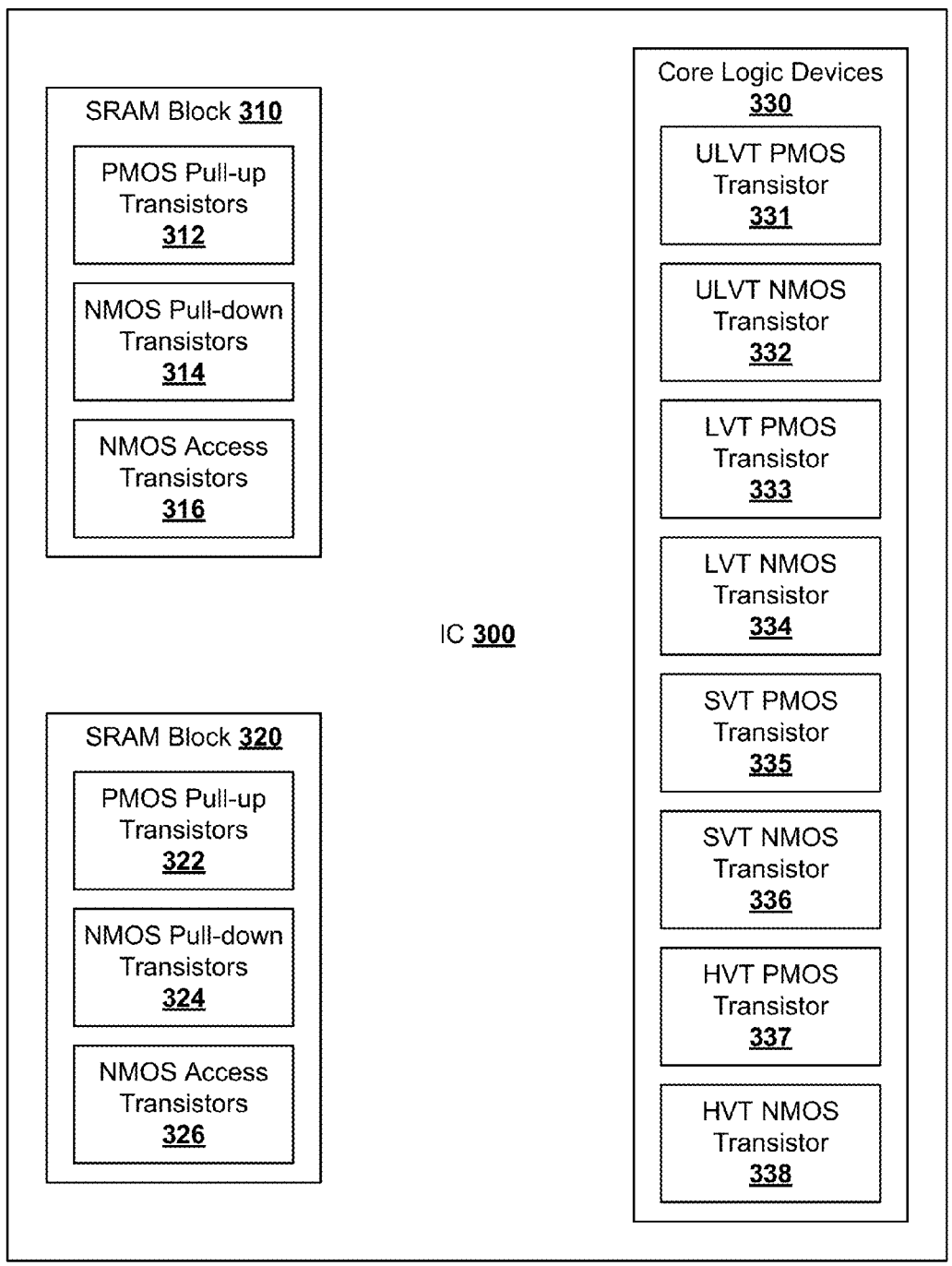
FIG. 3 is a block diagram showing an example of an IC.

FIG. 3 is a block diagram showing an example of an IC 300. The IC 300 includes a SRAM block 310, a SRAM block 320, and core logic devices 330. The SRAM block 310 includes PMOS pull-up transistors 312, NMOS pull-down transistors 314, and NMOS access transistors 316. Similarly, the SRAM block 320 includes PMOS pull-up transistors 322, NMOS pull-down transistors 324, and NMOS access transistors 326. The core logic devices 330 include circuits that perform basic logic functions such as logic gates, flip-flops, multiplexers, etc. The circuits of core logic devices 330 include transistors that operate at different threshold voltages. For example, the circuits include ultra low Vt (ULVT) transistors 331 and 332, low Vt (LVT) transistors 333 and 334, standard Vt (SVT) transistors 335 and 336, and high Vt (HVT) transistors 337 and 338.

During manufacturing of the IC 300, the bodies of the PMOS pull-up transistors 312 of the SRAM block 310 can be tied to the body of any one of the PMOS transistors 331, 333, 335, 337 of the core logic devices 330. Similarly, the bodies of the NMOS pull-down transistors 314 of the SRAM block 310 can be tied to the body of any one of the NMOS transistors 332, 334, 336, 338 of the core logic devices 330. Additionally, the bodies of the NMOS access transistors 316 of the SRAM block 310 can be tied to the body of any one of the NMOS transistors 332, 334, 336, 338 of the core logic devices 330. Accordingly, the transistors of the SRAM block 310 are decoupled from the SVT transistors 335 and 336, and their threshold voltages are independently adjustable during manufacturing to meet design requirements such as speed, delay, and power consumption.

Similarly, the bodies of the PMOS pull-up transistors 322 of the SRAM block 320 can be tied to the body of any one of the PMOS transistors 331, 333, 335, 337 of the core logic devices 330. Similarly, the bodies of the NMOS pull-down transistors 324 of the SRAM block 320 can be tied to the body of any one of the NMOS transistors 332, 334, 336, 338 of the core logic devices 330. Additionally, the bodies of the NMOS access transistors 326 of the SRAM block 320 can be tied to the body of any one of the NMOS transistors 332, 334, 336, 338 of the core logic devices 330. Accordingly, the transistors of the SRAM block 320 are decoupled from the SVT transistors 335 and 336, and their threshold voltages are independently adjustable during manufacturing to meet design requirements.

This increased flexibility may be accomplished in the mask making step of the manufacturing process. As part of the manufacturing process, a set of masks is created to capture the design of the IC. The masks define the patterns that form the elements of the electronic devices and the interconnecting wires. The set of masks include masks defining the layers for Vt implant or work function metal that tie together the bodies of transistors that are to have the same threshold voltage. For example, one or more masks can be used to tie together the bodies of ULVT transistors such that the threshold voltages of the ULVT transistors are aligned. During the mask making step, the mask or masks that are used to tie together certain transistors of the core logic device 330 can be defined such that transistors of the SRAM block 310 or the transistors of the SRAM block 320 that are to have the same threshold voltage are also tied together. In this way, the threshold voltages of transistors are independently adjustable without increasing the complexity of the manufacturing process because this technique involves using the same number of masks and processing steps as are used to tie SRAM transistors to only SVT transistors.

The set of masks defining the layers for aligning threshold voltages may be created before the first chip is fabricated. For example, mask creation may include creating one mask that ties SRAM transistors with SVT transistors, one mask that ties SRAM transistors with ULVT transistors, one mask that ties SRAM transistors with LVT transistors, and one mask that ties SRAM transistors with HVT transistors. These masks can be applied to fabricate different test chips for collecting silicon characterization data to determine which mask to use in production. The mask for final production of the chip is then selected from these previously created masks.

When creating the masks for tying bodies of transistors on the IC, mask layers for the Vt implant or work function metal can be derived from existing mask layers with the use of Boolean operations. The Boolean operations include AND (the intersection of two patterns), OR (the union of two patterns), XOR (the union less the intersection), NOT (the opposite of one pattern or one of two patterns less the intersection), etc. The proper operation on existing mask layers can be used to define mask layers for adjusting the threshold voltages of the SRAM NMOS and PMOS transistors independently to realize the desired driving strength ratios between the SRAM NMOS and PMOS transistors. Optionally, a dummy marker layer may be used to designate the transistors with the threshold voltages that are to be aligned with specific SRAM NMOS and PMOS transistors. The dummy marker layer may be used with existing mask layers to define the mask layers for adjusting the threshold voltages of the SRAM NMOS and PMOS transistors.

Figure 4:
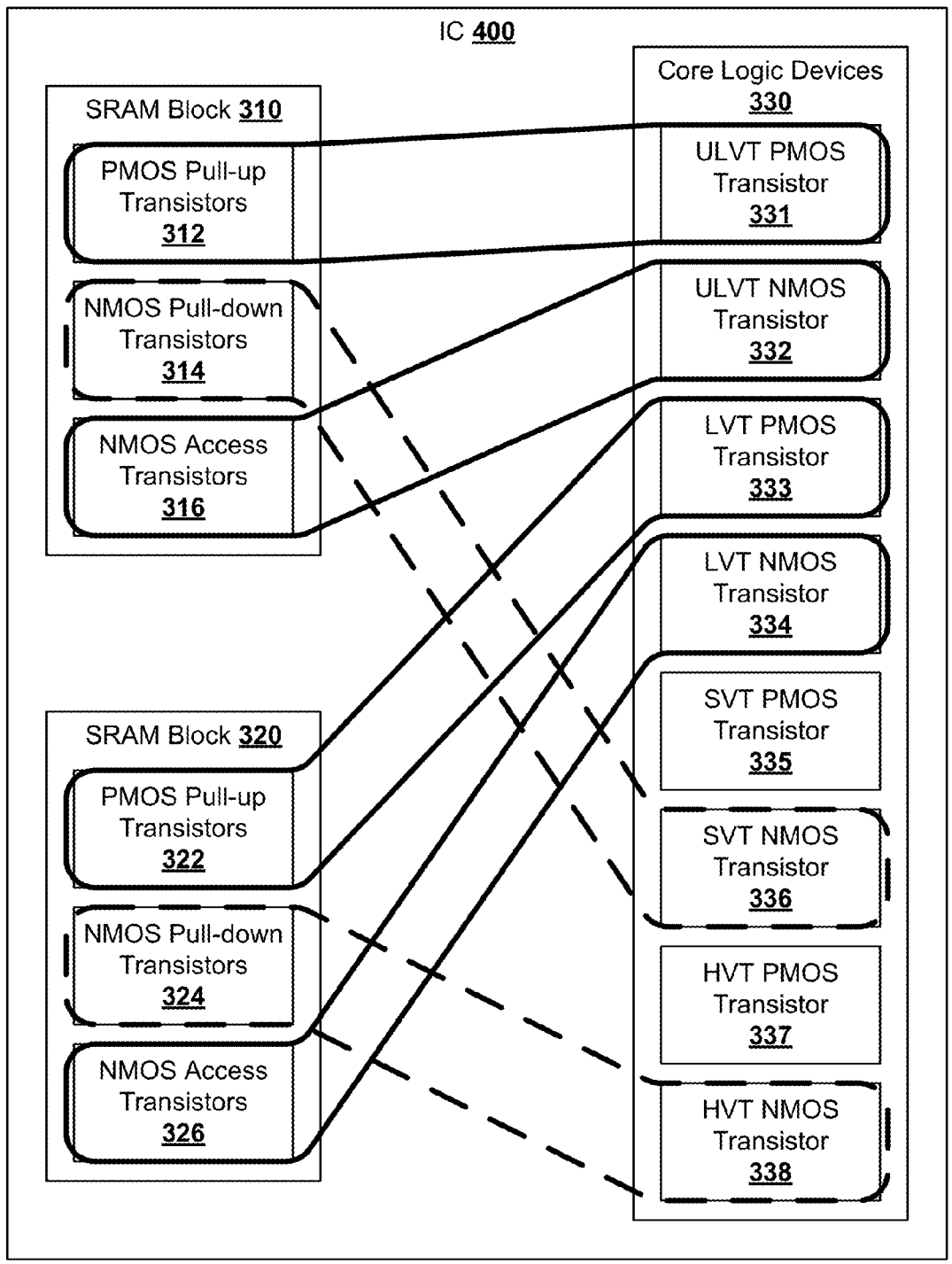
FIG. 4 is a block diagram showing an example of an IC after patterning using masks.

FIG. 4 is a block diagram showing an example of an IC 400 after patterning the IC 300 using the masks. The patterns of the masks tie together bodies of transistors on the IC 300 in order to align the threshold voltages of the transistors. As shown in FIG. 4, the PMOS pull-up transistors 312 of the SRAM block 310 are tied to the ULVT PMOS transistor 331 of the core logic devices 330, and thus the threshold voltages of the PMOS pull-up transistors 312 are aligned with the threshold voltage of the ULVT PMOS transistor 331. The NMOS pull-down transistors 314 of the SRAM Block 310 are tied to the SVT NMOS transistor 336 of the core logic devices 330, and thus the threshold voltages of the NMOS pull-down transistors 314 are aligned with the threshold voltage of the SVT NMOS transistor 336. The NMOS access transistors 316 of the SRAM Block 310 are tied to the ULVT NMOS transistor 332 of the core logic devices 330, and thus the threshold voltages of the NMOS access transistors 316 are aligned with the threshold voltage of the ULVT NMOS transistor 332. The sets of transistors 322, 324, 326 of the SRAM block 320 are respectively tied to transistors 333, 334, 338 of the core logic devices.

While FIG. 4 shows the sets of SRAM transistors being tied to different transistors of the core logic devices 330, multiple sets of SRAM transistors may be tied to the same transistor of the core logic devices 330. For example, to provide both SRAM blocks 310 and 320 with the fastest available data transfer speed, the NMOS access transistors 316 of the SRAM block 310 and the NMOS access transistors 326 of the SRAM block 320 may be tied to the ULVT NMOS transistor 332 of the core logic devices 330, which provides the SRAM access transistors with an ultra-low threshold voltage. Thus, different SRAM blocks can be independently optimized to meet the same or different design goals.

Figure 5:
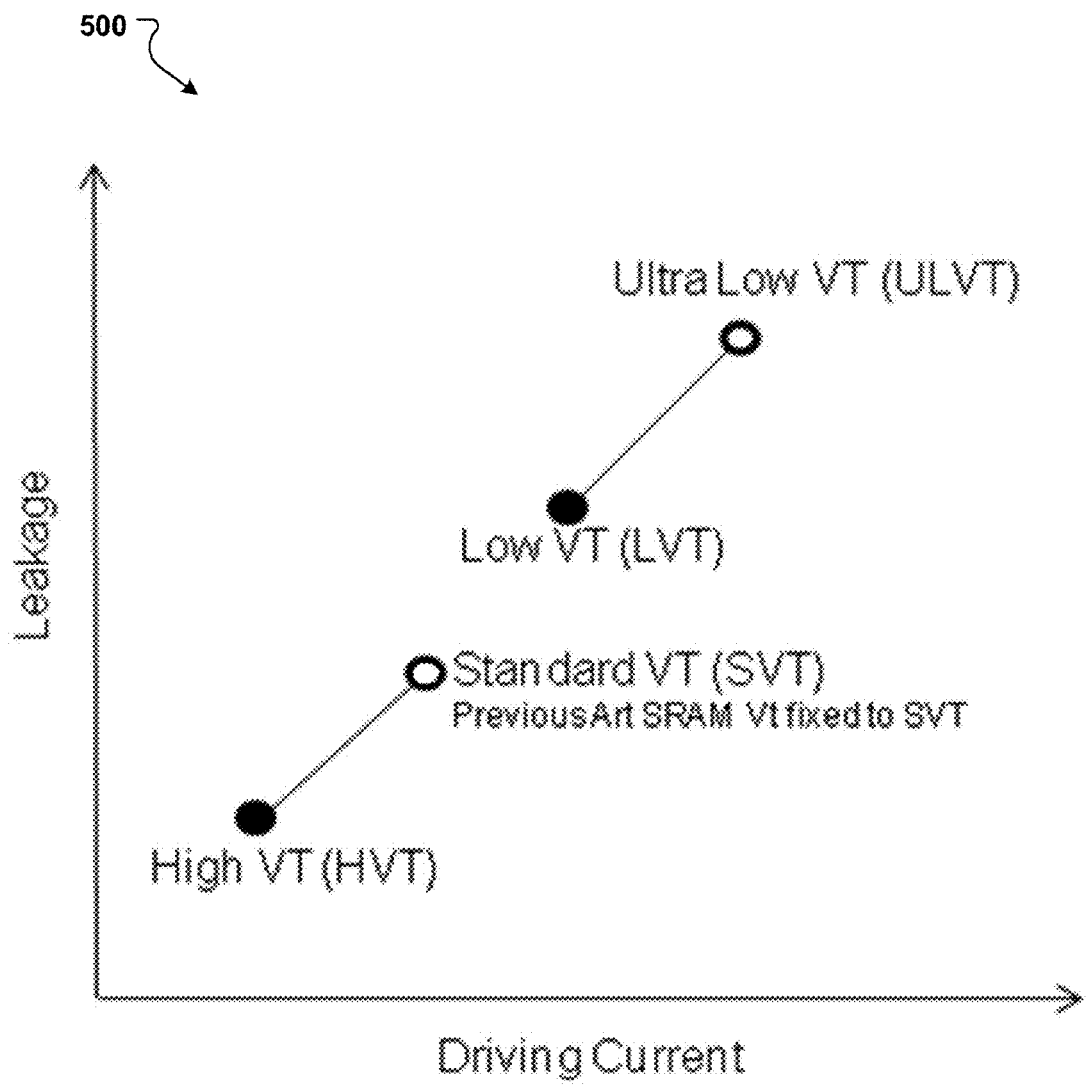
FIG. 5 is a graph showing an example of available threshold voltages for core logic devices in FinFET process technologies and their relationships with leakage and driving current for a SRAM cell.

FIG. 5 is a graph 500 showing an example of available threshold voltages for core logic devices in FinFET process technologies and their relationships with leakage and driving current for a SRAM cell. The FinFET process offers a set of threshold voltages (e.g., ULVT, LVT, SVT, HVT) that can provide a SRAM cell with high driving current or low leakage. During manufacturing, the SRAM transistor threshold voltage can be changed from SVT to another threshold voltage (e.g., any one of ULVT, LVT, HVT) based on silicon characterization data or design requirements. For example, to increase the pull-up speed of a SRAM PMOS transistor, the threshold voltage for the transistor can be changed from SVT to LVT or ULVT by tying the body of the SRAM PMOS transistor to the body of a LVT or ULVT transistor of a core logic device. Additionally or alternatively, to decrease the pull-down speed of a SRAM NMOS transistor, the threshold voltage for the transistor can be changed from SVT to HVT by tying the body of the SRAM NMOS transistor to the body of a HVT transistor of a core logic device.

Figure 6:
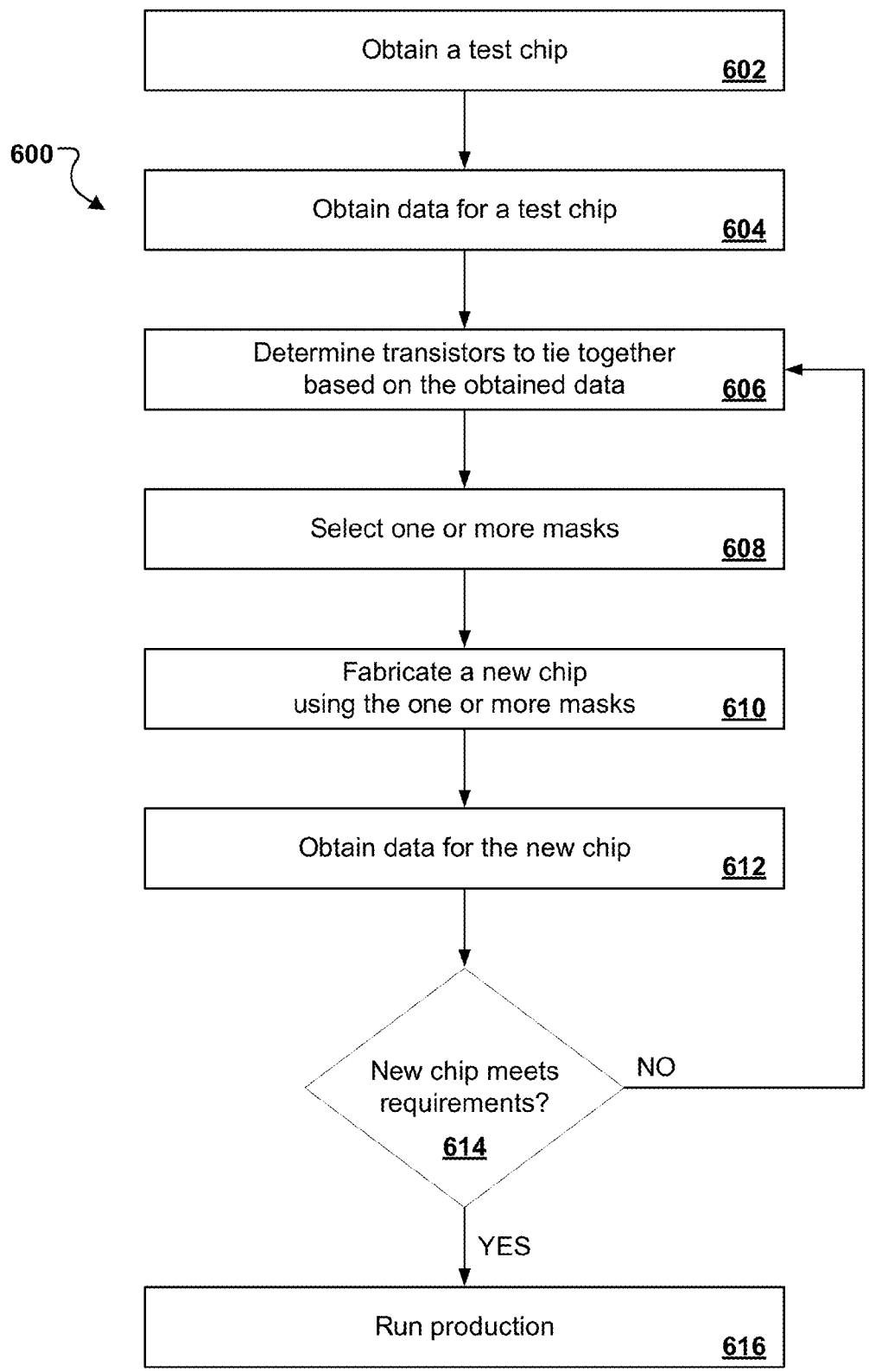
FIG. 6 is a flowchart of a process for manufacturing an IC.

FIG. 6 is a flowchart of a process 600 for manufacturing an IC. The IC includes multiple transistors (e.g., in core logic devices) covering multiple threshold voltage values (e.g., HVT, SVT, LVT, ULVT). The IC also includes a device (e.g., a SRAM) having at least one transistor for which the threshold voltage is adjusted during the manufacturing process. The process will be described in the context of an IC that includes core logic devices and a SRAM; however, the process is applicable to other implementations of ICs that include additional or different devices.

At 602, a test chip is obtained. The test chip contains a test IC that includes a SRAM transistor for which the threshold voltage is to be adjusted. The test IC is fabricated based on initial SRAM threshold voltage and driving current targets. For the test IC, the body of the SRAM transistor may be tied to the body of a SVT transistor.

At 604, data for the test chip is obtained. A variety of electrical tests may be performed on the IC to collect data for the SRAM, including silicon characterization data relating to the silicon behavior of the test chip. The tests include testing the chip at typical processing and operating parameters, as well as at corners, e.g., extremes of silicon behavior caused by a high operating temperature and/or voltage combined with extremes of fabrication processing steps.

At 606, a transistor to tie with the SRAM transistor is determined based on the obtained data and design requirements. The determination is made based on the adjustment needed to the threshold voltage for the SRAM transistor in order to meet yield and design requirements. For example, if the SRAM transistor's threshold value needs to be a ULVT in order to meet yield and design requirements, a determination is made that the SRAM transistor is to be tied to a ULVT transistor.

At 608, one or more masks that would tie the SRAM transistor with the desired transistor are selected. The selecting may include selecting from masks that were previously created for each available threshold voltage value. For example, mask creation may include creating one mask that ties SRAM transistors with SVT transistors, one mask that ties SRAM transistors with ULVT transistors, one mask that ties SRAM transistors with LVT transistors, and one mask that ties SRAM transistors with HVT transistors. A mask may be selected from these previously created masks.

Alternatively, the selecting may include creating or taping-out one or more new masks from pre-existing masks (e.g., pre-existing mask layers and/or dummy marker layers). When creating the masks for tying together bodies of transistors on the IC, mask layers for the Vt implant or work function metal can be derived from existing mask layers with the use of Boolean operations, as described above.

At 610, a new chip is fabricated using the selected masks. In addition to or as an alternative to using the selected masks, the metal gate interface metal thickness of the SRAM transistor may be adjusted to fine tune the threshold voltage of the SRAM transistor when fabricating the new chip.

At 612, data for the new chip is obtained. A variety of electrical tests may be performed on the IC to collect data for the SRAM, including silicon characterization data relating to the silicon behavior of the new chip. The tests include testing the new chip at typical processing and operating parameters, as well as corners.

At 614, a determination is made whether the new chip meets requirements based on the obtained data. The requirements include design requirements and yield requirements. If the new chip meets the requirements, production is run with the design of the new chip at 616. If the new chip does not meet the requirements, then the operations 606 through 614 are repeated until a chip that meets the requirements is designed and fabricated.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method of fabricating an integrated circuit, the method comprising:
   obtaining first characterization data for a first chip containing a first version of the integrated circuit, the integrated circuit comprising a transistor for which a threshold voltage is to be adjusted, the integrated circuit comprising a plurality of other transistors having different threshold voltage values, the first version of the integrated circuit comprising the transistor being coupled with a first one of the plurality of other transistors;
   determining, based on i) the obtained first characterization data and ii) one or more design requirements for the integrated circuit related to the threshold voltage of the transistor, that the transistor should be coupled with a second one of the plurality of other transistors;
   in response to determining that the transistor should be coupled with the second one of the plurality of other transistors, selecting one or more masks for coupling the transistor with the second one of the plurality of other transistors to adjust the threshold voltage of the transistor;

obtaining second characterization data for a second chip containing a second version of the integrated circuit, the second version of the integrated circuit comprising the transistor being coupled with the second one of the plurality of other transistors;

determining, based on the obtained second characterization data, that the second version of the integrated circuit meets the one or more design requirements; and in response to determining that the second version of the integrated circuit meets the one or more design requirements, preparing a final integrated circuit design for production based on the second version of the integrated circuit.

2. The method of claim 1, wherein obtaining the first characterization data and the second characterization data comprises obtaining data relating to a static random access memory (SRAM) comprising the transistor for which the threshold voltage is adjusted.

3. The method of claim 1, wherein determining that the transistor should be coupled with the second one of the plurality of other transistors comprises determining that the transistor should be coupled with one of a plurality of transistors of core logic devices.

4. The method of claim 1, wherein determining that the transistor should be coupled with the second one of the plurality of other transistors comprises determining that the transistor should be coupled with one of the plurality of other transistors having the different threshold voltage values, the plurality of other transistors having the different threshold voltage values comprising at least two of the following: a transistor having a standard threshold voltage (SVT) value, a transistor having a high threshold voltage (HVT) value, a transistor having a low threshold voltage (LVT) value, and a transistor having an ultra low threshold voltage (ULVT) value.

5. The method of claim 1, wherein:

obtaining the first characterization data comprises obtaining data relating to the transistor being coupled with a transistor having a standard voltage threshold (SVT) value, and obtaining the second characterization data comprises obtaining data relating to the transistor being coupled with one of a transistor having a high voltage threshold (HVT) value, a transistor having a low voltage threshold (LVT) value, or a transistor having an ultra low threshold voltage (ULVT) value.

6. The method of claim 1, wherein obtaining the first characterization data and obtaining the second characterization data comprises obtaining silicon characterization data of the first chip and the second chip tested at process, voltage, and temperature corners.

7. The method of claim 1, wherein:

obtaining the first characterization data comprises obtaining data relating to one or more static random access memories (SRAMs) comprising the transistor and another transistor;

determining that the transistor should be coupled with the second one of the plurality of other transistors comprises determining that the transistor of the one or more SRAMs should be coupled with a first one of a plurality of transistors of core logic devices and determining that the another transistor of the one or more SRAMs should be coupled with a second, different one of the plurality of transistors of the core logic devices;

selecting the one or more masks comprises selecting one or more masks for coupling the transistor of the one or more SRAMs with the first one of the plurality of transistors of the core logic devices to adjust the threshold voltage of the transistor of the one or more SRAMs and selecting one or more masks for coupling the another transistor of the one or more SRAMs with the second, different one of the plurality of transistors of the core logic devices to adjust a threshold voltage of the another transistor of the one or more SRAMs;

obtaining the second characterization data comprises obtaining data relating to the one or more SRAMs, the one or more SRAMs comprising the transistor being coupled with the first one of the plurality of transistors of the core logic devices and the another transistor being coupled with the second, different one of the plurality of transistors of the core logic devices;

determining that the second version of the integrated circuit meets the one or more design requirements comprises determining that the one or more SRAMs comprising the transistor being coupled with the first one of the plurality of transistors of the core logic devices and the another transistor being coupled with the second, different one of the plurality of transistors of the core logic devices meets the one or more design requirements based on the obtained second characterization data; and preparing the final integrated circuit design for production comprises preparing the final integrated circuit design for production based on the one or more SRAMs comprising the transistor being coupled with the first one of the plurality of transistors of the core logic devices and the another transistor being coupled with the second, different one of the plurality of transistors of the core logic devices.

8. An integrated circuit manufactured by a process comprising:

obtaining first characterization data for a first chip containing a first version of the integrated circuit, the integrated circuit comprising a transistor for which a threshold voltage is to be adjusted, the integrated circuit comprising a plurality of other transistors having different threshold voltage values, the first version of the integrated circuit comprising the transistor being coupled with a first one of the plurality of other transistors;

determining, based on i) the obtained first characterization data and ii) one or more design requirements for the integrated circuit related to the threshold voltage of the transistor, that the transistor should be coupled with a second one of the plurality of other transistors;

in response to determining that the transistor should be coupled with the second one of the plurality of other transistors, selecting one or more masks for coupling the transistor with the second one of the plurality of other transistors to adjust the threshold voltage of the transistor;

obtaining second characterization data for a second chip containing a second version of the integrated circuit, the second version of the integrated circuit comprising the transistor being coupled with the second one of the plurality of other transistors;

determining, based on the obtained second characterization data, that the second version of the integrated circuit meets the one or more design requirements; and in response to determining that the second version of the integrated circuit meets the one or more design requirements, preparing a final integrated circuit design for production based on the second version of the integrated circuit.

9. The integrated circuit of claim 8, wherein obtaining the first characterization data and the second characterization data comprises obtaining data relating to a static random access memory (SRAM) comprising the transistor for which the threshold voltage is adjusted.

10. The integrated circuit of claim 8, wherein determining that the transistor should be coupled with the second one of the plurality of other transistors comprises determining that the transistor should be coupled with one of a plurality of transistors of core logic devices.

11. The integrated circuit of claim 8, wherein determining that the transistor should be coupled with the second one of the plurality of other transistors comprises determining that the transistor should be coupled with one of the plurality of other transistors having the different threshold voltage values, the plurality of other transistors having the different threshold voltage values comprising at least two of the following: a transistor having a standard threshold voltage (SVT) value, a transistor having a high threshold voltage (HVT) value, a transistor having a low threshold voltage (LVT) value, and a transistor having an ultra low threshold voltage (ULVT) value.

12. The integrated circuit of claim 8, wherein:
obtaining the first characterization data comprises obtaining data relating to the transistor being coupled with a transistor having a standard voltage threshold (SVT) value, and
obtaining the second characterization data comprises obtaining data relating to the transistor being coupled with one of a transistor having a high voltage threshold (HVT) value, a transistor having a low voltage threshold (LVT) value, or a transistor having an ultra low threshold voltage (ULVT) value.

13. The integrated circuit of claim 8, wherein obtaining the first characterization data and obtaining the second characterization data comprises obtaining silicon characterization data of the first chip and the second chip tested at process, voltage, and temperature corners.

14. The integrated circuit of claim 8, wherein:
obtaining the first characterization data comprises obtaining data relating to one or more static random access memories (SRAMs) comprising the transistor and another transistor;
determining that the transistor should be coupled with the second one of the plurality of other transistors comprises determining that the transistor of the one or more SRAMs should be coupled with a first one of a plurality of transistors of core logic devices and determining that the another transistor of the one or more SRAMs should be coupled with a second, different one of the plurality of transistors of the core logic devices;
selecting the one or more masks comprises selecting one or more masks for coupling the transistor of the one or more SRAMs with the first one of the plurality of transistors of the core logic devices to adjust the threshold voltage of the transistor of the one or more SRAMs and selecting one or more masks for coupling the another transistor of the one or more SRAMs with the second, different one of the plurality of transistors of the core logic devices to adjust a threshold voltage of the another transistor of the one or more SRAMs;
obtaining the second characterization data comprises obtaining data relating to the one or more SRAMs, the one or more SRAMs comprising the transistor being coupled with the first one of the plurality of transistors of the core logic devices and the another transistor being coupled with the second, different one of the plurality of transistors of the core logic devices;
determining that the second version of the integrated circuit meets the one or more design requirements comprises determining that the one or more SRAMs comprising the transistor being coupled with the first one of the plurality of transistors of the core logic devices and the another transistor being coupled with the second, different one of the plurality of transistors of the core logic devices meets the one or more design requirements based on the obtained second characterization data; and
preparing the final integrated circuit design for production comprises preparing the final integrated circuit design for production based on the one or more SRAMs comprising the transistor being coupled with the first one of the plurality of transistors of the core logic devices and the another transistor being coupled with the second, different one of the plurality of transistors of the core logic devices.

15. The integrated circuit of claim 14, wherein obtaining the first and second characterization data comprises obtaining data relating to a SRAM comprising the transistor and the another transistor.

16. The integrated circuit of claim 14, wherein obtaining the first and second characterization data comprises obtaining data relating to an SRAM comprising the transistor and another SRAM comprising the another transistor.

17. An integrated circuit, comprising:
one or more static random access memories (SRAMs) comprising a plurality of SRAM transistors; and
a plurality of core logic devices comprising a plurality of core logic transistors having different threshold voltage values,
wherein a first SRAM transistor of the plurality of SRAM transistors of the one or more SRAMs is coupled with a first core logic transistor of the plurality of core logic transistors having a first threshold voltage value thereby setting a threshold voltage of the first SRAM transistor at the first threshold voltage value,
wherein a second SRAM transistor of the plurality of SRAM transistors of the one or more SRAMs is coupled with a second, different core logic transistor of the plurality of core logic transistors having a second, different threshold voltage value thereby setting a threshold voltage of the second SRAM transistor at the second, different threshold voltage value.

18. The integrated circuit of claim 17, wherein the plurality of core logic transistors having the different threshold voltage values comprises at least two of the following: a transistor having a standard threshold voltage (SVT) value, a transistor having a high threshold voltage (HVT) value, a transistor having a low threshold voltage (LVT) value, and a transistor having an ultra low threshold voltage (ULVT) value.

19. The integrated circuit of claim 17, wherein the first SRAM transistor and the second SRAM transistor are transistors of a same SRAM of the one or more SRAMs.

20. The integrated circuit of claim 17, wherein the first SRAM transistor and the second SRAM transistor are transistors of different SRAMs of the one or more SRAMS.

* * * * *